United States Patent [19]
Chapman

[11] Patent Number: 4,979,876
[45] Date of Patent: Dec. 25, 1990

[54] FOLDABLE PROPULSION SYSTEM

[75] Inventor: William I. Chapman, Birmingham, Mich.

[73] Assignee: Williams International Corporation, Walled Lake, Mich.

[21] Appl. No.: 367,614

[22] Filed: Jun. 19, 1989

[51] Int. Cl.⁵ .............................................. B64C 27/50
[52] U.S. Cl. ..................................... 416/143; 416/87; 416/140; 244/3.29
[58] Field of Search ................... 416/142, 143, 87, 88, 416/131, 134 R, 134 A, 140, 146 R, 120, 128; 244/3.29; 60/226.1

[56] References Cited

U.S. PATENT DOCUMENTS

| | | | |
|---|---|---|---|
| 2,608,257 | 8/1952 | Godfrey | 416/142 A |
| 3,047,726 | 7/1962 | Warnken | 416/143 |
| 3,633,850 | 1/1972 | Feldman | 416/143 |
| 3,853,288 | 12/1974 | Bode | 244/3.29 |
| 3,957,229 | 5/1976 | Davis | 416/87 |

FOREIGN PATENT DOCUMENTS

| | | | |
|---|---|---|---|
| 1341652 | 9/1963 | France | 416/140 |
| 461247 | 4/1975 | U.S.S.R. | 416/143 |

Primary Examiner—John T. Kwon
Attorney, Agent, or Firm—Lyon & Delevie

[57] ABSTRACT

An improved blade folding system for a propfan propulsion system comprises a fan blade journaled for rotation from a folded position substantially tangentially related to the housing of an engine to a radially extending run condition.

4 Claims, 2 Drawing Sheets

FOLDABLE PROPULSION SYSTEM

BACKGROUND OF THE INVENTION

Small high speed propfans exhibit relatively high efficiency when employed as an aircraft propulsion system. However, in certain missile applications, the propfan is larger in diameter than the missile and cannot be stored as completely or launched as easily as a turbo jet or turbo fan powered missile.

One solution to the aforesaid problem as taught in application Ser. No. 305,164 filed Feb. 2, 1989, and assigned to the assignee of the present invention, is to hinge the propeller blade so that it can be folded to a position extending generally parallel to the thrust axis of the propulsion system. A hinge is provided near the blade root having a hinge line extending at a right angle to the axis of rotation of the blade. However, the aforesaid solution to the problem of propeller folding is aerodynamically inefficient and, in addition, exacerbates the problem of radar signature due to the geometry of such a folding mechanism.

Thus, although the aforesaid blade folding system solves the storage problem, it does not present a total solution to the problem of applying a propfan to a missile since it exhibits relatively poor aerodynamic characteristics and a poor radar signature in the run condition.

SUMMARY OF THE INVENTION

The propfan propulsion system of the present invention features propeller blades that fold about an axis extending at an acute angle to the thrust axis of the propulsion system to a position extending generally laterally of said axis. The geometry of the folding mechanism is such that the hinge axis of the blades is essentially coextensive with the outside diameter of the missile. The blades are provided with arcuate root sections so that, when extended, the blades exhibit a smooth transition from the blade section to the hub. The transition comprises a fillet that extends entirely around the root of the blade thereby precluding sharp corners, reentrant angles, projections, joints or gaps.

The aforesaid geometry is made possible by utilizing a pocket radially inwardly of the hinge axis of each blade. A finger extends from the blade to act as a stop against a blade support. An offset is provided in the blade support relative to the hinge point to permit the blade to pivot approximately 90 degrees.

The propulsion system of the present invention presents a minimal radial cross section in the storage condition as well as good aerodynamic characteristics and minimal radar signature in the run condition.

DETAILED DESCRIPTION OF THE PREFERRED EMBODIMENT OF THE INVENTION

Figure 1:
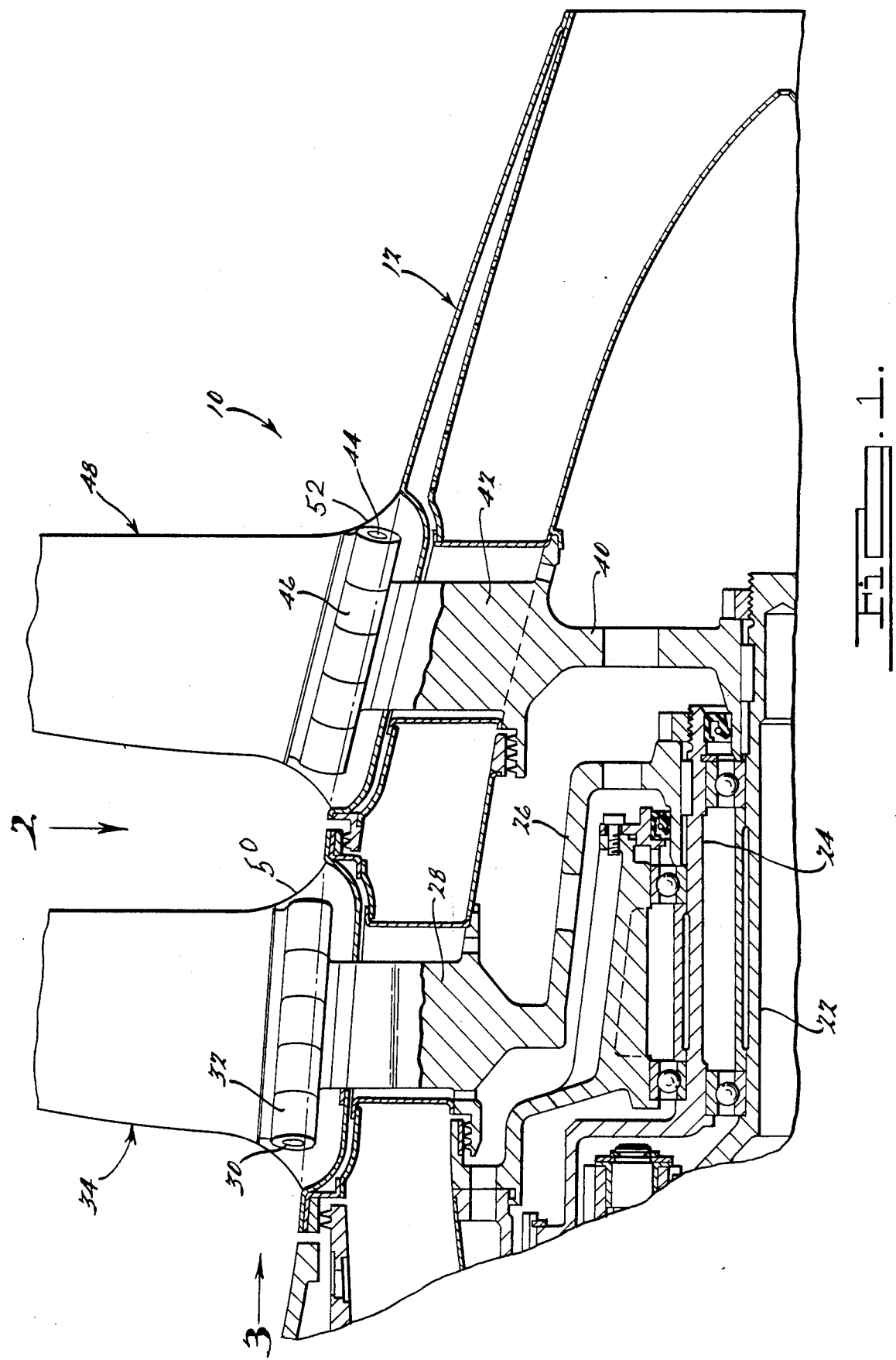
FIG. 1 is a fragmentary sectional view of a turbine engine having the propulsion system of the instant invention with the fan blades extended.
Figure 2:
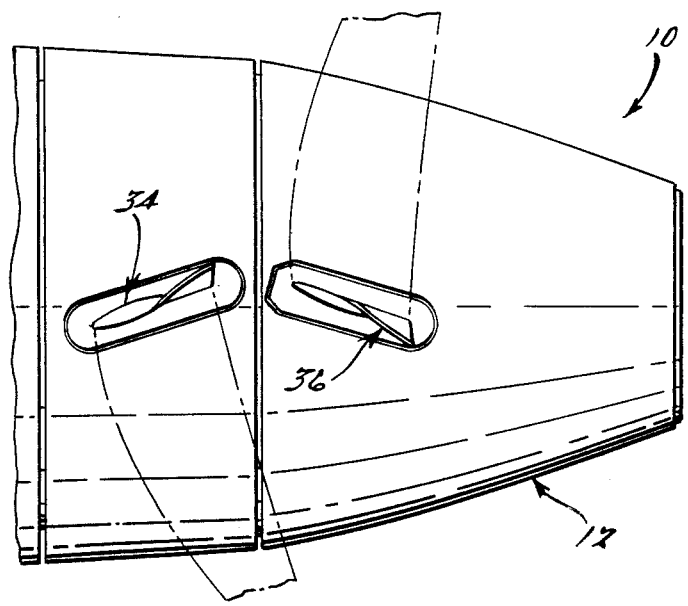
FIG. 2 is a view taken in the direction of the arrow "2" of FIG. 1.

As seen in FIG. 1 of the drawings a propfan engine 10 comprises an elongated generally cylindrical housing 12. Power is taken off the engine 10 through a pair of coaxial cylindrical drive shaft sleeves 22 and 24. The radially outer drive shaft sleeve 24 has an annular flange 26 for the support of a plurality of radially extending blade supports 28, one of which is shown in FIG. 1 of the drawings. Each blade support 28 has a pin 30 extending therethrough which journals a radially inner end portion 32 of a forward fan blade 34. The blade 34 is shown in the radially extended or propulsion condition in FIG. 1.

Similarly, the radially inner drive shaft sleeve 22 has a radial flange 40 for the support of a plurality of rear blade supports 42, one of which is shown in FIG. 1. A pin 44 journals a radially inner end portion 46 of a rear fan blade 48.

In accordance with one feature of the present invention, and in order to fold the blades 34 and 48 to an essentially tangential, laterally extending position relative to the engine housing 12, the hinge pins 30 and 44, respectively, are disposed at an acute angle to the thrust axis of the engine 10 and essentially radially coextensive with the cross-sectional profile thereof. The pins 30 and 44 are enclosed by flared root sections 50 and 52 of the blades 34 and 48, respectively.

Figure 3:
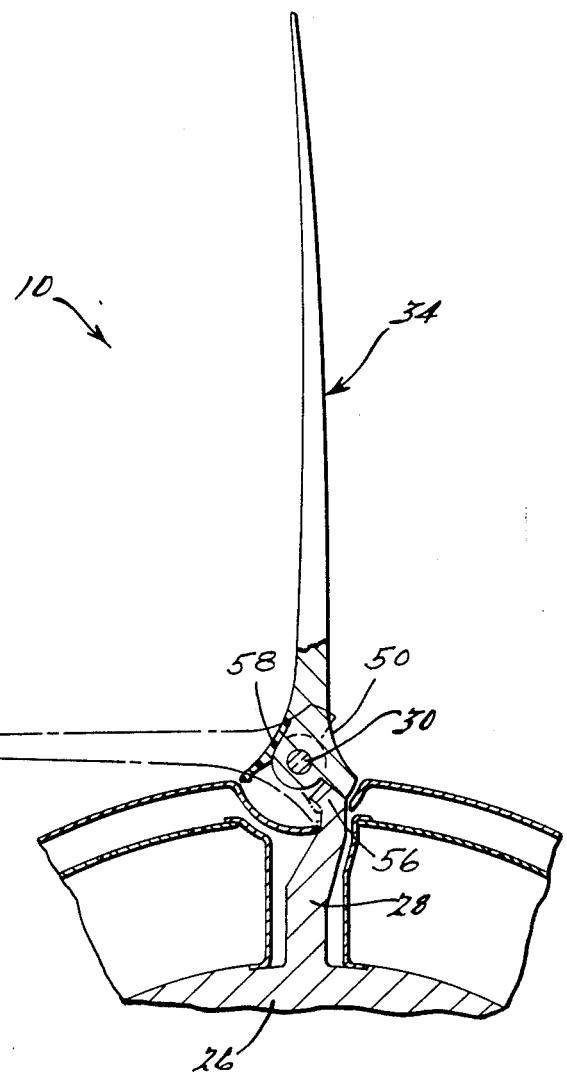
FIG. 3 is a view taken in the direction of the arrow "3" of FIG. 1.

As best seen in FIG. 3, an end portion 54 of the blade 34 engages a gooseneck portion 56 of the blade support 28 to locate the blade 34 in the run condition.

It is also to be noted that the opposite side of the root section 50 is provided with an arcuate fillet elements or a flared element 58 which is bonded in place after assembly of the blade 34 and pin 30 to the blade support 28. The gooseneck portion 56 accommodates the element 58 when the blade 34 is in the storage condition.

While the preferred embodiment of the invention has been disclosed, it should be appreciated that the invention is susceptible of modification without departing from the scope of the following claims.

I claim:

1. In a propfan propulsion system comprising a turbine engine having a generally cylindrical housing and a drive shaft sleeve with a radially extending fan blade support thereon, an improved blade folding system comprising
    a pin supported by said blade support in radial coextensive relation to the radial cross-section of said engine housing, said pin extending at an acute angle to the axis of rotation of said drive shaft sleeve to facilitate folding of said fan blade to a laterally extending storage condition,
    said fan blade journaled on said pin for rotation from the folded condition to a radially extending run condition, and
    an arcuate fillet extending completely around a root portion of said fan blade for exhibiting a smooth continuous arcuate transition from said blade to said engine housing.

2. A propulsion system in accordance with claim 1 wherein said arcuate fillet encompasses said pin.

3. A propulsion system in accordance with claim 1 wherein said fan blade support has an end portion of gooseneck cross section to facilitate folding and acceptance of the fillet portion of said fan blade.

4. A propulsion system in accordance with claim 3 wherein said gooseneck is engageable by a flared root portion of said blade to limit erection of said blade.

* * * * *